J. Hinkley.
Straight Knitting Mach.
No. 55,103.  Patented May 29, 1866.

Sheet 3, 8 Sheets.

Witnesses.
J. Curtis
G. H. Washburn

Inventor.
Jonas Hinkley.
by his Attorney
R. H. Eddy.

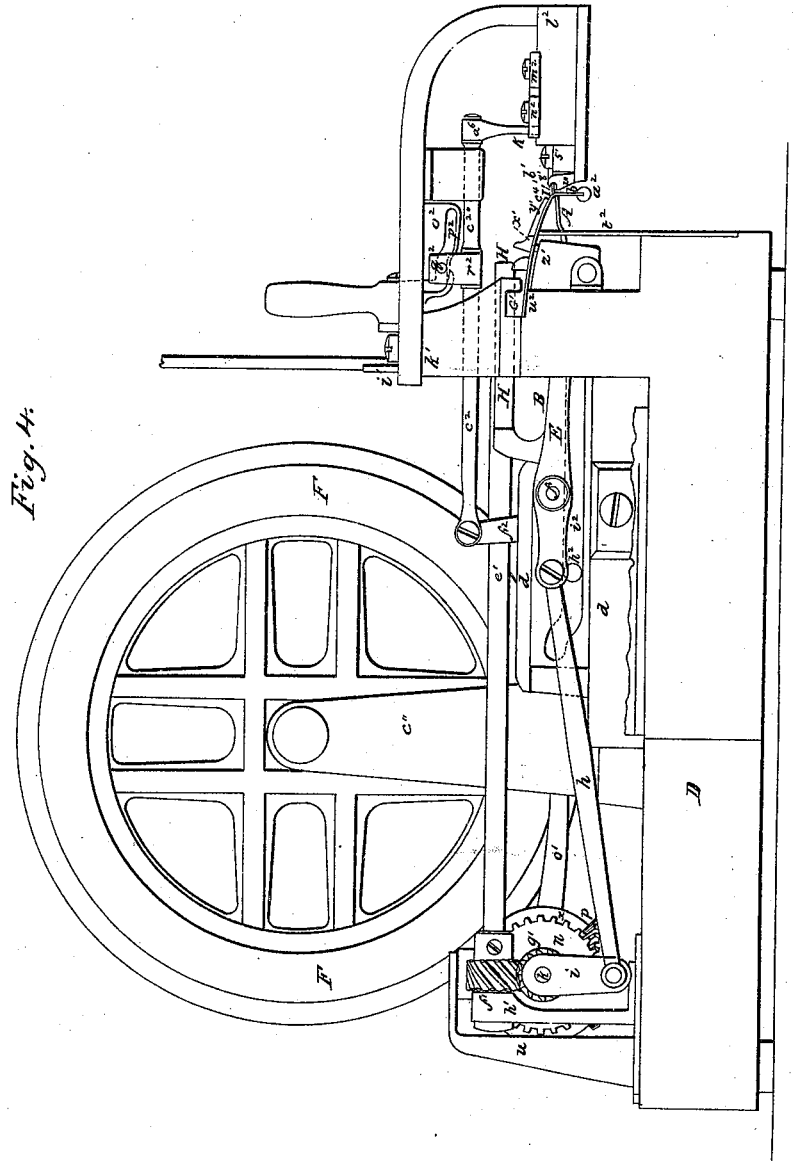

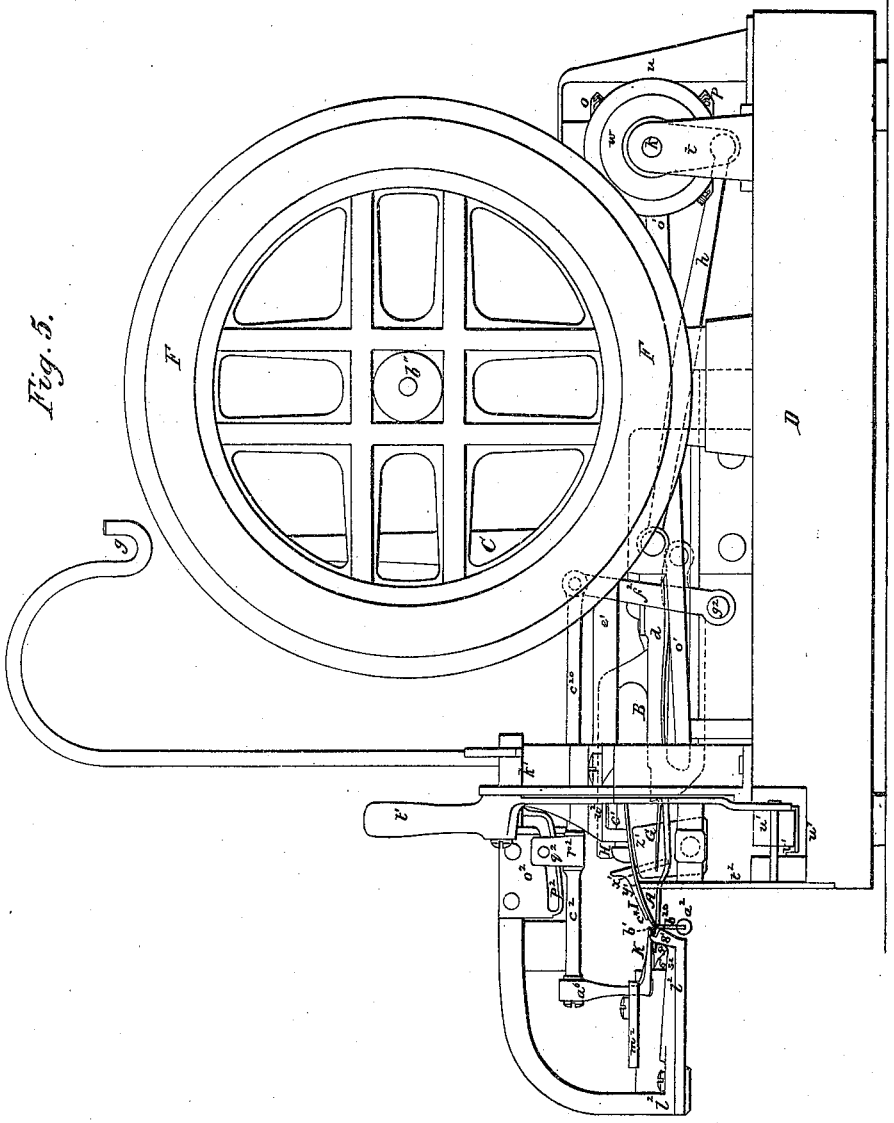

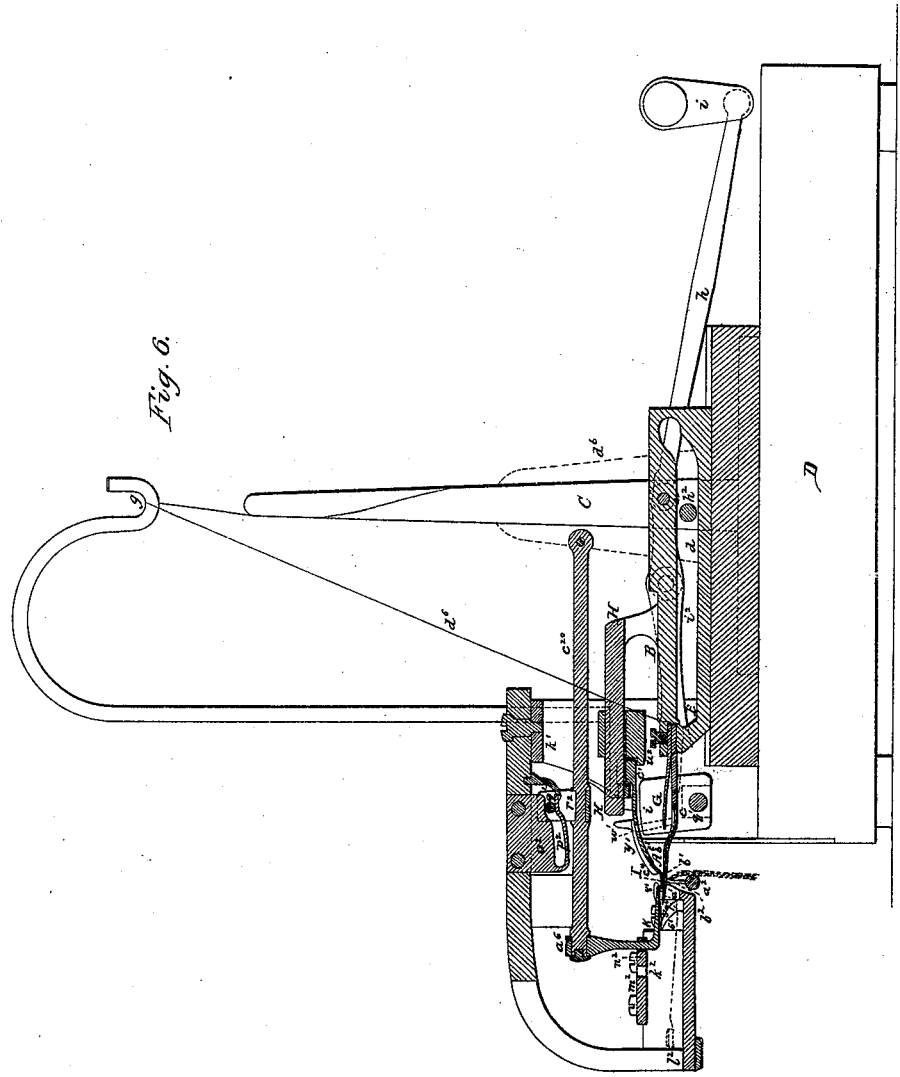

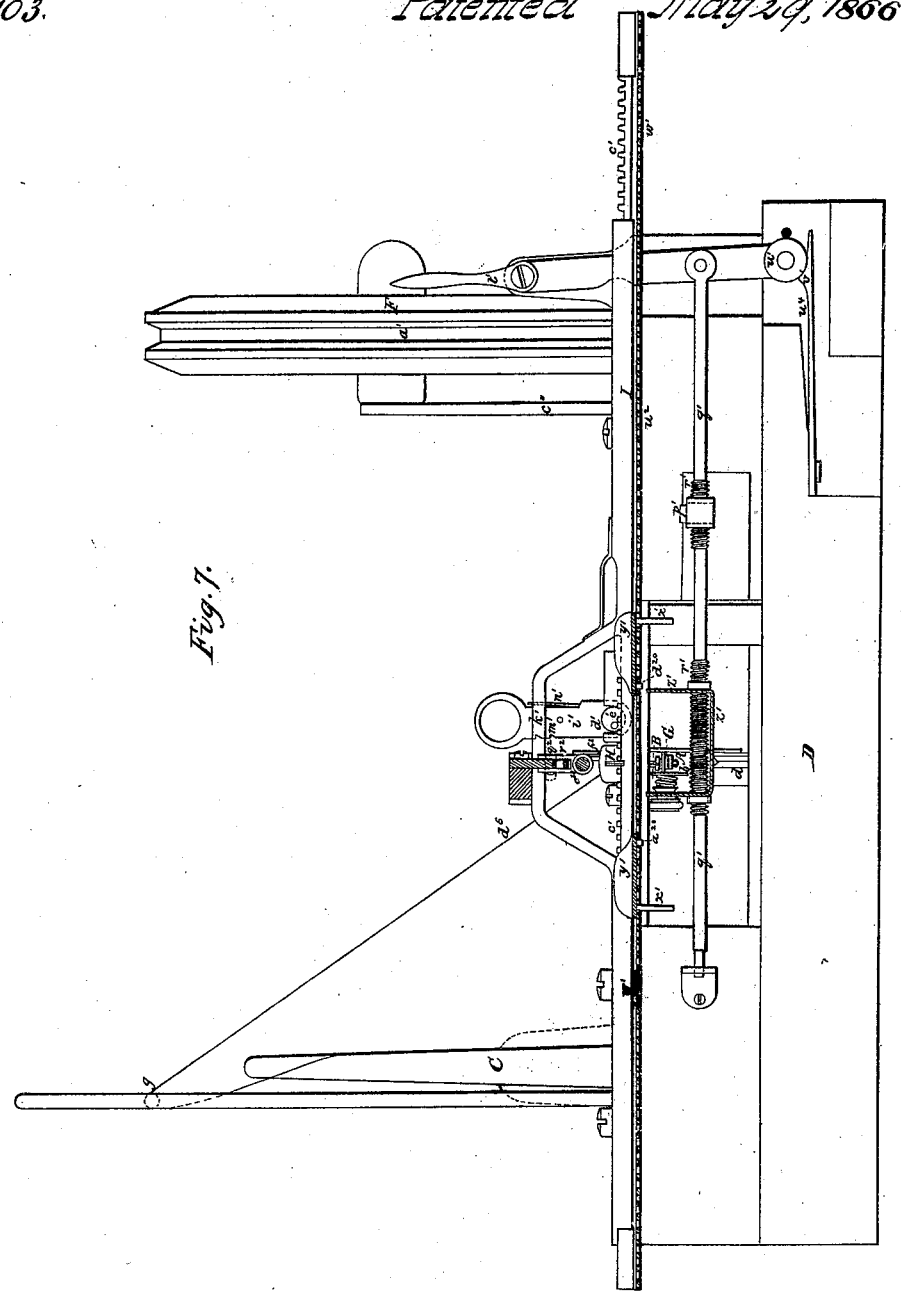

J. Hinkley.
Straight Knitting Mach.
No. 55,103.
Sheet 8, 8 Sheets.
Patented May 29, 1866.
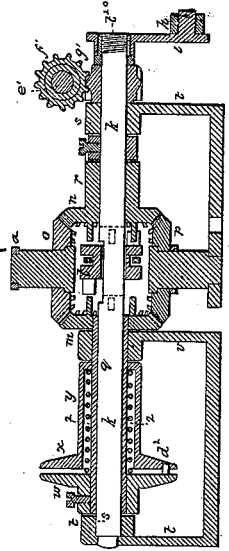
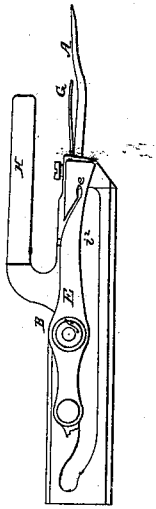
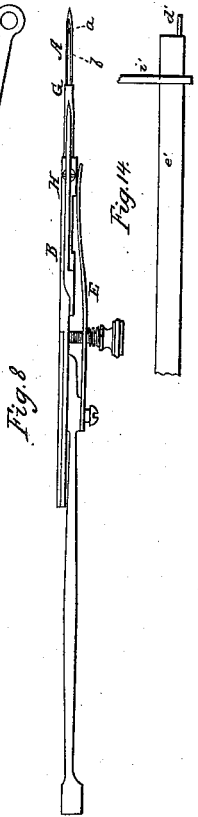
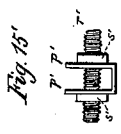
Witnesses.
H. Curtis
G. H. Washburn
Inventor:
Jonas Hinkley.
by his Attorney,
R. H. Eddy

UNITED STATES PATENT OFFICE.

JONAS HINKLEY, OF NORWALK, OHIO.

IMPROVEMENT IN KNITTING-MACHINES.

Specification forming part of Letters Patent No. 55,103, dated May 29, 1866.

*To all whom it may concern:*

Be it known that I, JONAS HINKLEY, of Norwalk, of the county of Huron and State of Ohio, of the United States of America, have made an invention of a new and useful Knitting-Machine; and I do hereby declare the nature thereof and the manner in which it is to be performed or is constructed and operates to be hereinafter particularly set forth and described, reference being had to the accompanying drawings, of which—

Figure 1:
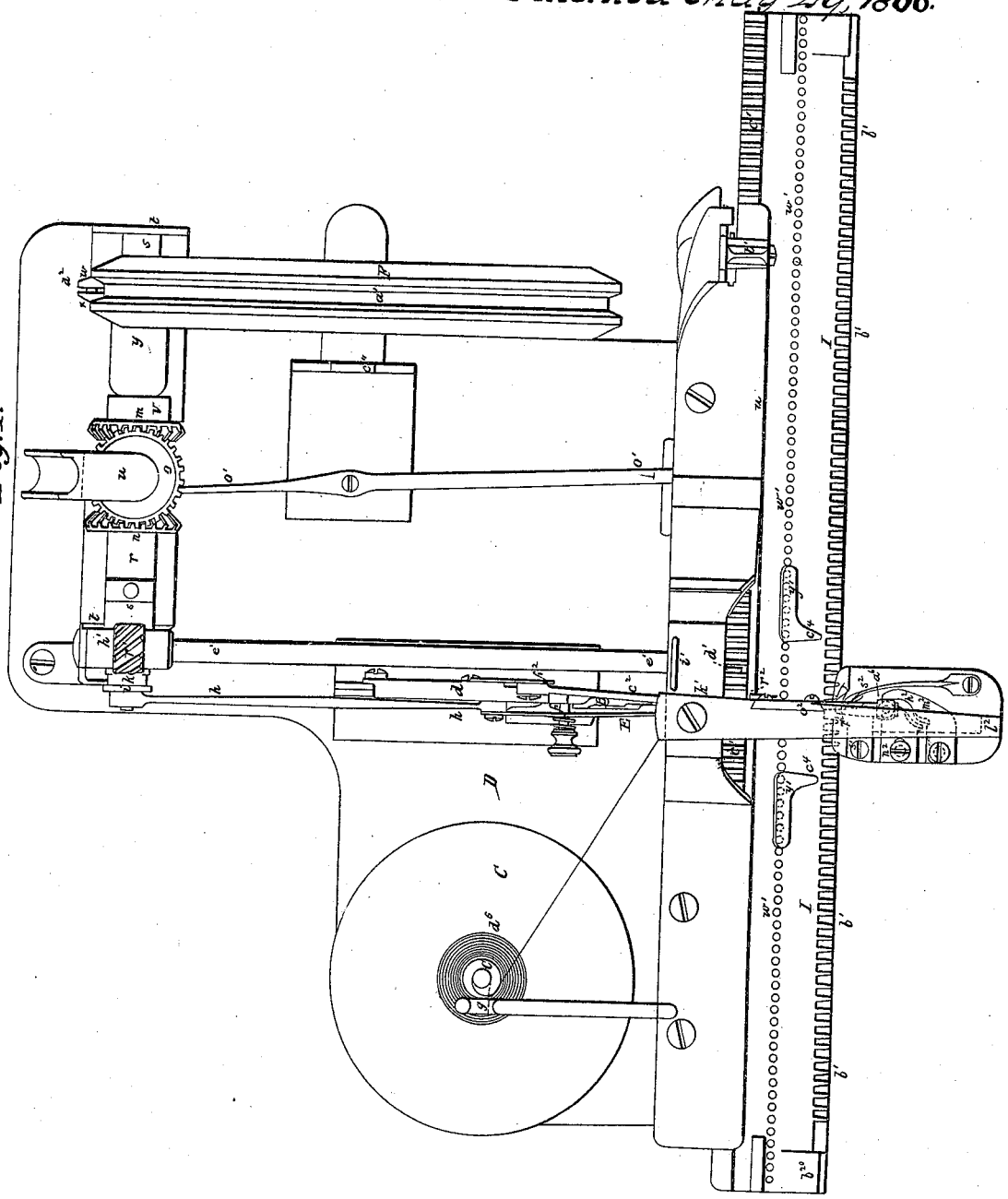
Figure 2:
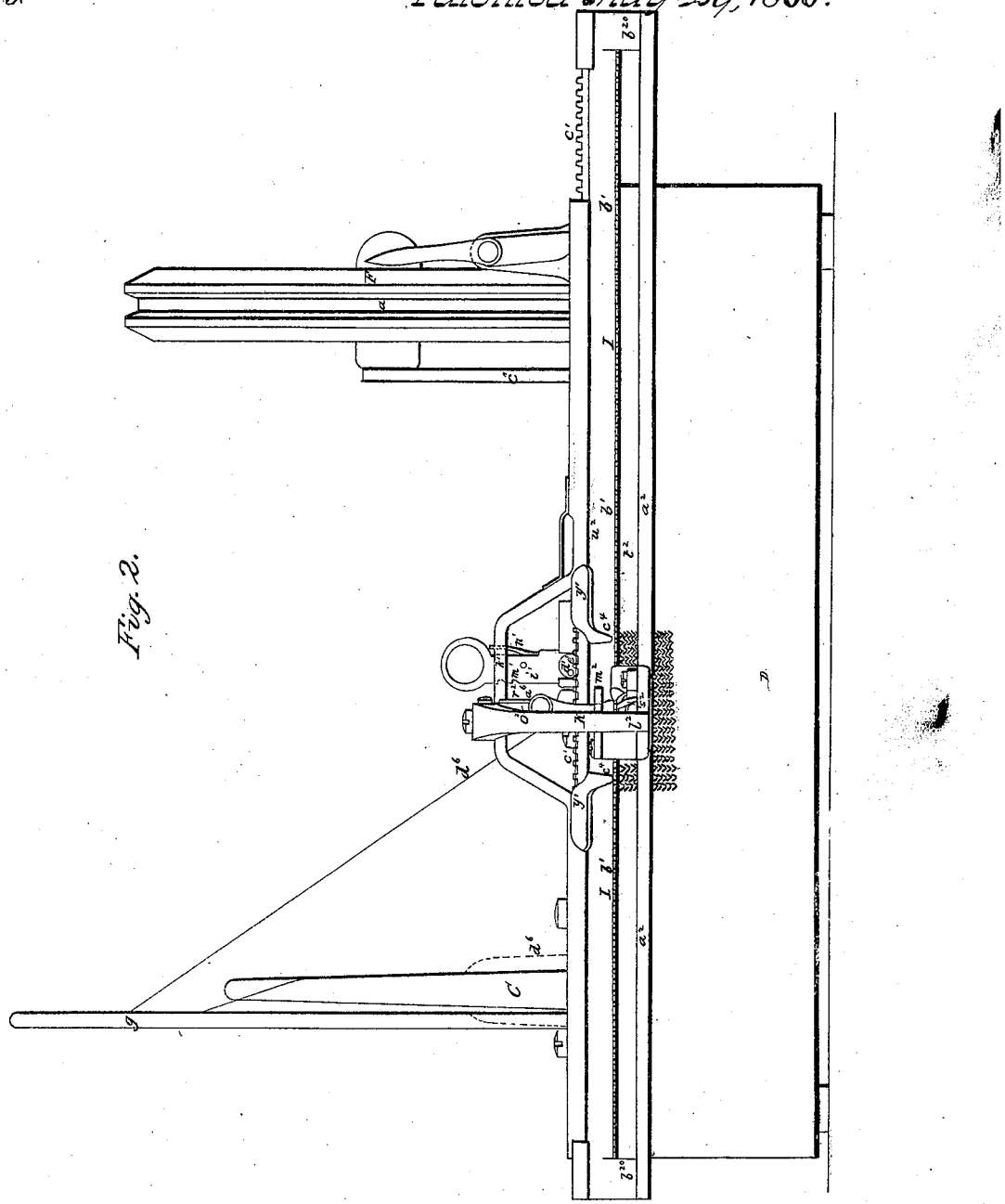
Figure 3:
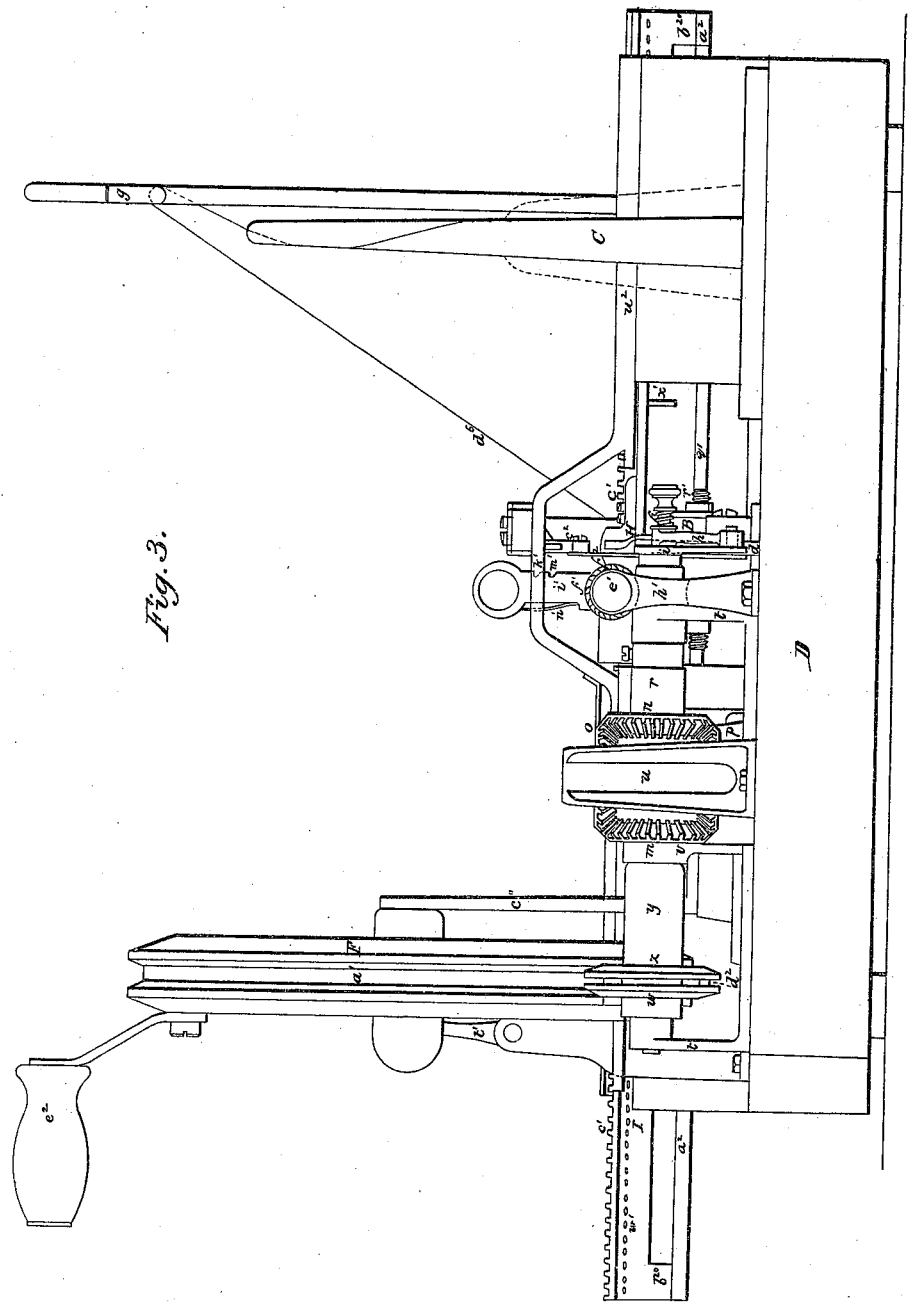

Figure 1 is a top view; Fig. 2, a front elevation; Fig. 3, a rear elevation; and Figs. 4 and 5 are end elevations of it. Fig. 6 is a vertical and transverse section of it, such section being taken through the needle. Fig. 7 is a vertical section taken longitudinally through the work-supporting comb and the mechanism for changing its motions and effecting the "narrowing" and "widening" of the work or fabric. Fig. 8 is a top view, and Figs. 9 and 10 are side elevations, of the needle and its carrier. Fig. 11 is a vertical and longitudinal section of the clutch-shaft and the mechanism thereof. The remaining figures are hereinafter referred to and described.

This machine is distinguished from others for the production of knit fabrics by the means which it contains for the performance or production of the knitting-stitch. A pointed needle, (provided with an eye near its point, or with the same and another eye, as hereinafter described,) a looper, and a work-supporting comb, with their operative mechanisms, are the principal instrumentalities or the constituents of the main combination of this machine. With these certain auxiliaries are employed, as and for the objects or purposes to be hereinafter particularly explained.

In the drawings, A denotes the said needle, which is pointed at its working extremity, and is provided with an eye, $a$, near its point, such eye going transversely through the needle. The needle is more particularly represented in top view in Fig. 12 and in longitudinal section in Fig. 13. Its shank is curved, as shown in these figures, and it has a groove, $b$, extending from or near its point back to another eye, $c$, which goes down through the needle at or near the junction of the curved and straight portions of the shank. The needle so made is fastened in a carrier or slider, B, duly supported between and by parallel guides $d\ d$, in order that it, with the needle, may be moved rectilinearly with reciprocating movements relatively to the comb I.

The yarn $d^6$ to be used may be wound upon a spool or bobbin, $c$, which may be supported on the base-plate D of the machine and connected therewith by a screw. From the said spool the yarn is led upward through a guide, $g$, placed over the spool, thence downward toward and into the notch $e$ of a tension-spring, E, which is applied to the side of the needle-carrier, and is provided with a screw, $f$, for regulating its pressure on the yarn.

After passing into the said notch the yarn is led between the needle-carrier and the tension-spring, and thence upward through the rear eye of the needle, thence along in the groove, and thence down through the front eye of the needle, through which it should be drawn two or three inches preparatory to operating the machine, when it will cast on the first row of stitches by running the comb to the left, or, in other words, let up the work itself.

A rod or pitman, $h$, jointed to the needle-carrier, connects it with the wrist of a crank, $i$, fixed on the clutch-shaft $k$, the rod $h$ being so made as to enable it to be readily slipped off the said wrist, as occasion may require, for the removal of the carrier and needle from the rest of the mechanism, which is usually done in order to "thread" the needle more readily. The shaft $k$ has a clutch, $l$, arranged upon it between two bevel-gears, $m\ n$, provided with teeth to engage with the clutch. Two connecting-gears, $o\ p$, engage with the gears $m\ n$, the said connecting-gears being duly supported within a standard, $u$.

Each of the connecting-gears $m\ n$ is fixed to one of two tubular shafts, $q\ r$, which encompass the clutch-shaft or are arranged thereon, as represented. The said clutch-shaft is supported in bearings $s\ s$, formed in two standards, $t\ t$, erected on the base-plate D. Another standard, $v$, serves to aid in supporting the shaft $q$.

A friction-disk, $w$, is fixed on the clutch-shaft $q$, and is arranged by the side of another disk, $x$, which is carried by a tubular and chambered shaft, $y$, that encompasses the shaft $q$, and contains a helical spring, $z$. The said spring also encircles the shaft $q$, and bears at one end against the disk $w$, and operates to press the two disks apart and against the sides of a groove, $a'$, formed in the circumference of a fly or driving wheel, F, duly supported on a journal, $b''$, projecting from a standard, $c''$, extending upward from the base-plate.

A stud, $d^2$, extending from the disk $w$, enters the disk $x$ and serves to so couple the two disks as to cause them to revolve together. By revolving the fly-wheel by manual power applied to a crank, $e^2$, extending from it, or by power otherwise suitably directed upon the said wheel, the friction of the wheel against the disks will produce a rotary motion of the shaft $q$, which, by means of the series of bevel-gears $m$ $n$ $o$ $p$, will impart to the shaft $r$ a rotary motion in a direction contrary to that in which the shaft $q$ may revolve.

The clutch $l$ should be so applied to the shaft $k$ as to revolve with it and be capable of being slid or moved endwise on it in a manner to engage the clutch with either of the gears $m$ $n$. From the above it will be seen that when the clutch is in engagement with the gear $m$ the shaft $k$ will be revolved in one direction, but when the clutch is engaged with the gear $n$ the shaft will be revolved in an opposite direction; but in whichever of these directions the shaft may be turned its crank $i$ will impart to the needle-carrier reciprocating rectilinear movements.

The cast-off is exhibited at G as projecting from the needle-carrier and situated over the needle, it being a simple tongue of steel formed and arranged as represented, it being for the purpose hereinafter described.

A long wedge-pointed arm or detent, H, formed and extended from the needle-carrier in the manner shown in the drawings, enters the rack of the comb I while the needle is advancing, and serves to maintain or keep the comb in its due position with respect to the needle during the production of the stitch. During the retreat of the needle the arm H passes out of the rack.

The said comb, formed as represented in the drawings—that is, with a series of short teeth, $b'$ $b'$, projecting from its front edge—is arranged directly over the path of the needle and at right angles to such path. A rack, $c'$, is fixed on the rear part of the upper surface of the comb, its teeth being arranged directly opposite, or nearly so, to the spaces between the teeth of the comb. The distance between the middles or centers of each of two next adjacent teeth of the rack corresponds with that between the middles of any two next adjacent teeth of the comb. The comb thus made is supported on suitable guides or ways $t^2$ $u^2$, so as to enable it to be moved longitudinally.

A short pin or stud, $d'$, projecting from one end of a shaft, $e'$, and arranged eccentrically with respect to the axis of the shaft, imparts to the rack during each revolution of the shaft an intermittent rectilinear motion. The said shaft derives its rotary motion by means of or through two spiral toothed gears, $f'$ $g'$, one of which is fixed on it, the other being attached to the clutch-shaft $k$.

The shaft $e'$ is sustained by one stationary bearing, $h'$, in which it is loosely arranged, and by a movable plate, $i'$.

Fig. 14 is a side view of the shaft $e'$, and Fig. 15 is a vertical section of its lifter $i'$ and the arch $k'$, in which it is sustained. There are two notches, $l'$ $m'$, on the edge of the shaft-lifter $i'$, and there is also a spring, $n'$, attached to it for pressing it laterally so as to engage either of the said notches with the standard or arch. By means of the said lifter the shaft may be elevated so as to carry its stud out of action with the rack, or it may be depressed so as to introduce or bring the stud into action with the said rack.

A shifting-lever, $o'$, properly applied to the clutch $l$, and arranged as represented, serves to move such clutch into engagement with either of the gears $m$ $n$. The longer arm of the said lever goes between two adjustable studs, $p'$ $p'$, projecting from a slide-rod, $q'$. (See Fig. 7, and also Fig. 15, which is a top view of the two studs and the slide-rod, and shows the studs as consisting of a piece of metal, bent in the form exhibited, arranged on a long screw, $r'$, made on the rod, and held in place thereon by nuts $s'$ $s'$.) The rod $q'$ is jointed to a hand-lever, $t'$, which carries a roller, $u'$, to work against a spring, $u^4$, provided with a projection, $v'$, the whole being as shown in the drawings.

By means of the hand-lever the shifting-lever can be moved so as to move the clutch. In this way the extent of movement of the comb in either direction may be determined by an attendant with his hand applied to the said hand-lever; but the machine contains a mechanism by which these movements of the comb may be effected automatically. For this purpose the comb-plate is provided with a row of holes, as shown at $w'$, there being one of such holes to each tooth of the comb, they being arranged with respect to the comb-teeth in the manner as represented.

Two pins, $x'$ $x'$, projecting downward from the index-plates $y'$ $y'$, formed as shown in the drawings, are inserted in any two of the series of holes, and are to be placed at such distances apart from time to time as may be necessary to cause the machine to knit such a distance on the comb as may be desirable. These pins $x'$ $x'$ are to operate with an arched piece or projection, $z'$, fixed on the slide-rod $q'$, and arranged as shown in Fig. 7. When, by the traversing movements of the comb, either pin is carried against the projection $z'$, it will move the slide-rod so as to cause the clutch to be moved from one to the other of the gears $m$ $n$, and thus reverse the motion of the comb. In this way the narrowing or widening of the work may be effected, as circumstances may require. Furthermore, each of the index-plates $y'$ is provided with a pointer, $c^4$, and with another and shorter stud, $d^{20}$, the latter being to enter one of the holes of the comb and to steady the plate or aid in keeping it in place on the comb. The pointer, by extending down to, or nearly to, the teeth of the comb, enables the longer stud of the plate to be properly adjusted for any one of the teeth, thus serving as a guide to the operator in narrowing and widening the work.

A rod, $a^2$, affixed at its two ends to arms $b^{20}$ $b^{20}$, projecting from the comb, serves, by extending along in front of the fabric being knit, to keep it properly suspended on the comb during the operation of knitting such fabric.

The next part of the machine to be described is the looper K and its operative mechanism. This looper, which is formed as shown in side view in Fig. 16, in top view in Fig. 17, and in rear view in Fig. 18, is projected down from a slide-rod or looper-rod, $c^{20}$, whose rear end is jointed to the upper end of a tri-armed lever, $f^2$, arranged as shown in the drawings and having its fulcrum at $g^2$. The middle or shortest arm of the lever has a stud, $h^2$, projecting from it into a long slot, $i^2$, made in the needle-carrier, said slot being straight, except at or near one end of it, which is cam-shaped or formed as represented. This shape or form of the slot is for the purpose of effecting the forward and backward movements of the looper through the stud $h^2$, operating in connection therewith.

The looper also has lateral and vertical movements imparted to it, the lateral motion being produced by a cam-groove, $k^2$, in which the shank of the looper is arranged, said shank being connected to the looper-rod $c^{20}$ by a joint, as represented at $a^6$. Fig. 19 exhibits this cam-groove and the mechanism contiguous to and below it as applied to or disposed in the extremity of a curved bracket, $l^2$, projecting from the arch $k'$. The bracket not only supports the parts or pieces of metal $m^2 n^2$ which form the cam-groove, but it also serves to support a plate, $o^2$, in which there is another cam-groove, $p^2$, whose office is to raise and depress or give vertical movements to the looper.

A stud, $q^2$, carried by a projection, $r^2$, from the looper-rod $c^{20}$, or to which the looper-rod is attached, or in which it is partly supported, enters the groove $p^2$, and during the longitudinal movements of the looper slide-rod $c^{20}$ it will be moved in the slot in such a manner as to cause the slot to effect the necessary vertical movements of the looper.

A small spring-finger, $s^2$, which is arranged on the bracket $l^2$ in the manner as represented, and which is formed as shown in Figs. 19 and 20, the latter being a side view of it, serves to assist the looper in taking the loop from the needle and to prevent the escape of the loop of yarn from the looper prior to such loop being elevated into the proper position to be discharged from the looper and received on a tooth of the comb. It also serves to assist in preventing the loop which is taken from the comb by the advancing needle, or by the action of the cast-off, after the first series or row of loops or stitches is formed, from being carried too far forward or away from the tooth by the needle. There is also disposed in the bracket $l^2$, and near to or about the path of the needle, a peculiarly-shaped guard or throat-piece, $5'$, made of metal, and so formed and arranged with respect to the needle as to partly surround it when the same is in position for the looper to take the loop from it. This guard has a part, $6'$, which projects over the path of the needle, and by which the needle is kept from being sprung or bent upward by the action of the looper. It also has another part, $7'$, projecting forward or toward the teeth of the comb and on the side of the needle opposite the spring-finger $s^2$, and in such a position in respect to the needle as to serve, alone or in conjunction with the said finger, to prevent the loop which the needle takes from the comb in forming the second or any subsequent row of stitches from being carried along with the needle, and so far from the comb as to break the yarn or draw the adjacent loops or stitches from their supporting-teeth.

The extreme end of the bracket $l^2$, or parts attached thereto, are grooved or slotted, as shown at $8'$ in Figs. 4, 5, and 6, and so arranged with respect to the comb that the teeth of the comb pass through the slot as the comb traverses. This slotted end or part operates or serves to keep the loops or stitches in the vicinity of the needle from being improperly thrown off or dropped from the teeth of the comb by the action of the needle, or from any other cause, and may be extended to any desired distance on either side of the needle, and can be so constructed and arranged as to be adjustable with reference to the comb to enable the work to be more easily removed from the machine. The bracket $l^2$ may also be made or constructed and arranged so as to be adjustable with reference to the comb. I will here state that the body part of the said comb could be made of cast-iron, the teeth being made of steel and properly attached thereto; and the teeth may be so constructed and arranged as to be individually removable from the comb, and may be bent or turned slightly upward or downward at the points; but I prefer the construction described and shown. A looping mechanism can also be arranged to traverse, the comb remaining stationary; but instead thereof I prefer that the comb should traverse.

There is made in the inner end of the clutch-shaft $k$ a screw-socket, $t^{20}$, and there is also projected from the bottom of the spool a screw to enter and screw into such socket, the same being to enable the spool to be so connected with the shaft $k$ or its crank as to be capable of being revolved with such shaft, for the purpose of enabling an attendant to readily wind yarn on the spool as occasion may require.

The operation of knitting by means of the said machine may be thus explained: During the advance of the needle the looper will be depressed and caused to pass under or about the needle and across and back of the yarn on its under side. Owing to the peculiar form of the looper, and the needle not having completed its advance movement, the looper will not catch the yarn while so passing. Next the looper will be moved in an opposite direction so as to catch the yarn upon it, the needle retreating at the same time. The looper, continuing to move, will bring the loop of yarn (on it) up to one of the teeth of the comb, the end of the looper resting on or being just above the upper surface of the tooth, so that while the needle may continue in retreat it may draw the loop away from the looper and upon the tooth of the comb. The comb is thus advanced, bringing the next adjacent tooth opposite the looper, when another loop may be formed in the same manner. After a row of loops may have thus been formed on the comb a reverse motion of the comb follows, preparatory to forming or knitting the next row of stitches, and the needle, being caused to advance, will enter and pass through one of the loops on the comb and carry the yarn through it.

While the needle is advancing through the loop the loop will be kept on the tooth until the needle has fairly entered it by means of the point of the looper, which is so arranged and operated as to prevent the loop from being pushed from the tooth by the needle until the needle has sufficiently entered it to secure it from being dropped. The looper is then moved away from the tooth, and the loop on the tooth, being left without means sufficient to resist the action of the advancing needle, will usually be pushed or slipped off the tooth onto the needle by the friction of the needle advancing through it; but when this does not occur the cast-off intended for this purpose will push the loop from the tooth and prepare the way for a new loop. The loop, when thus pushed from the tooth, is suspended by or supported on the advancing needle, and will usually be carried forward with it until brought into contact with the spring-finger $s^2$ or the part $7'$ of the guard $5'$, or with both, when the discharged loop will be held back by them, while the needle will continue to advance to the extent of its course.

In order that the needle may pass easily and readily through the loop suspended on it after said loop is in contact with the finger $s^2$ or part $7'$, and in order to make room for the old loop to pass back under the vacant tooth on the retreat of the needle as the new loop is passed on the tooth, the needle is made or formed in the bent or crooked manner shown. A new loop is now taken from the needle by the looper, as before described, and deposited on the tooth thus vacated or from which the old loop was pushed, as set forth. The new loop being deposited on the tooth, the retreating needle discharges or is withdrawn from the old loop, and it is left suspended by the new loop or becomes a part of the work. The comb is then advanced, preparatory to the production of the next loop or stitch, which is produced in the same manner.

Thus the machine may be continued to work, the distances of movement of the comb from time to time being regulated by the apparatus for effecting the narrowing and widening of the work. As soon as one row of stitches may have been completed the motion of the comb will be reversed automatically, or may be changed by the operator, and another row of stitches will be commenced and made.

I term the needle described an "eye-pointed needle," the looper K and parts working more immediately in connection therewith the "looping mechanism," the lever $o'$ and parts operating more immediately in connection therewith the "shipping mechanism," the spring E and parts operating more immediately in connection therewith the "tension mechanism," the shaft $e'$ and parts operating more immediately in connection therewith the "traversing mechanism," the parts operating to detain or hold the comb in position while the stitch is being formed the "detent mechanism," the parts operating to push the loop from the tooth when the same is not done by the needle and yarn passing through it the "cast-off mechanism," the parts operating to prevent the old or discharged loop being carried too far from the tooth by the advancing needle the "guard mechanism," and the comb I denominate the "work-supporting comb."

In the machine described it will be seen that the needle A is arranged with its grooved side upward, the yarn being passed through and under the tension-spring, thence upward through the rear eye, along in the groove, and downward through the front eye.

I do not confine myself strictly to the construction or arrangement of the needle as described, as the same may be differently constructed and arranged and yet perform the same office. The groove may be on the side of or under the needle, or may pass around it spirally, or the needle may have but one eye or more than two, (to obtain tension,) and the eyes may be made differently from those shown, and the same will apply to the other parts or mechanisms.

In constructing my machine I have sought to adopt whatever has appeared to be the simplest means of attaining certain results, the main or distinguishing features of the machine always being retained. I do not, therefore, confine myself strictly to the method herein described for carrying out any of the details of the mechanism shown, so that substantially the same results are produced.

I am also aware that a needle similar to the one herein described is used in that class of sewing-machines making what is commonly known as the "Grover and Baker" stitch. I therefore do not claim such needle in and of itself considered; but

What is claimed as of my invention in knit- ting-machines, or machinery for producing knit fabrics, is as follows:

1. An eye-pointed needle for carrying a thread or yarn, a work-supporting comb, on which the work or fabric is set up or supported, and a looper or looping mechanism, by means of which the stitch or loop is taken from the needle and conveyed to or deposited on the comb, or their equivalents, combined to operate for the production of knit fabrics, substantially in the manner set forth and specified.

2. An organism or combination consisting of an eye-pointed needle, a work-supporting comb, and a looping mechanism, substantially such as described, and a traversing mechanism, by which traversing movements of the said comb may be produced essentially in the manner and for the purposes set forth and specified.

3. An organism or combination consisting of an eye-pointed needle, a work-supporting comb, and a looping mechanism, substantially such as described, and a tension mechanism, by means of which a proper friction or tension is exerted on the yarn or thread while in the act of being knit, as and for the purposes set forth.

4. An organism or combination consisting of a work-supporting comb and traversing mechanism, substantially such as described, and a shipping mechanism, by which the movements of the said comb may be reversed, in the manner and for the purposes shown.

5. An organism or combination consisting of a work-supporting comb and its traversing mechanism, substantially such as described, and a detent mechanism, which operates to detain or hold the comb while the loop or stitch is being formed, in the manner and for the purposes set forth.

6. An organism or combination consisting of an eye-pointed needle, a work-supporting comb, and a looping mechanism, substantially such as described, and a cast-off mechanism, by which the loop is pushed from the tooth, in the manner and for the purposes set forth.

7. An organism or combination consisting of an eye-pointed needle for carrying the yarn being used, a work-supporting comb, on which the work is set up or supported, a looping mechanism, by which a loop or loops are taken from the needle and conveyed to or deposited on the comb, a traversing mechanism, by which traversing movements of the comb are produced, a shipping mechanism, by which the traversing movements of the comb are reversed, a detent mechanism, by means of which the comb is held while the loop is formed, and a cast-off mechanism, by which the loop is pushed from the tooth of a comb, and a tension mechanism, by which tension is applied to the yarn, the said instrumentalities, parts, or mechanisms, being substantially as hereinbefore described, and combined and used for the production of knit fabrics, essentially in the manner set forth and specified.

8. The combination of a work-supporting comb, substantially such as described, and a device by which the shipping mechanism may be automatically operated, essentially in the manner and for the purposes set forth.

9. The combination of a work-supporting comb, substantially such as described, and an index mechanism or means, as explained, (or its equivalent,) for indicating at what point the movement of the comb will be reversed, substantially in the manner and for the purposes specified.

10. The arrangement or application of the rod $a^2$ with the comb-teeth in such a manner as to traverse therewith, substantially in the manner and for the purposes specified.

11. A work-supporting comb constructed with a rod, $a^2$, and a rack and teeth, substantially as set forth and described.

12. The combination of a work-supporting comb, substantially such as described, and a slotted or grooved end or piece of metal, 8', or its equivalent, so arranged or disposed in relation to the comb that the teeth of the comb may pass through the groove or slot, whereby the loops, especially in the vicinity of the needle, will be more securely kept upon the said teeth, substantially as and for the purposes set forth.

13. The bracket $l^2$, for supporting or holding the parts disposed in or upon the same, as constructed and arranged, substantially as described.

14. A combination composed of an eye-pointed needle and a work-supporting comb, substantially such as described, and a guard mechanism, by which the discharged loop is prevented from being carried too far from the comb by the advancing needle, as described.

15. A combination consisting of a work-supporting comb, an eye-pointed needle, and a looper, substantially as described, and the projecting piece 6', or its equivalent, so arranged as to prevent the needle from being sprung upward by the action of the looper, substantially as set forth.

16. A combination consisting of an eye-pointed needle, a work-supporting comb, a looper, substantially such as described, and a spring-finger, $s^2$, for assisting in the conveyance of the loops from the needle to the tooth, as specified.

17. The finger $s^2$, so constructed and arranged as not only to assist in conveying the loop, as stated, but also to act as a part of the guard mechanism, substantially as and for the purpose set forth.

18. A guard mechanism one part of which is a spring so arranged that it will yield to admit of the use of a large or small needle, as circumstances may require, substantially as shown.

19. The combination of the cast-off G directly with the needle-carrier, so as to be operated by it, in the manner set forth and described.

20. The combination of the tension-spring

E directly with the needle-carrier, so as to operate with and be operated by it, substantially in the manner shown.

21. The combination of the arm or detent H directly with the needle-carrier, so as to be operated by it, substantially in the manner set forth.

22. The combination and arrangement of an eye-pointed needle, A, a tension mechanism or spring, E, a cast-off, G, and a detent, H, or their equivalents, so that any two or more of them will have but one carrier, substantially as set forth and described.

23. The extension of the tension-spring E back to the pitman or rod $h$, so that the same may also act to keep the said rod on the crank-wrist, substantially in the manner shown and specified.

24. The needle-carrier and looping mechanism, so combined and arranged with respect to each other that the looping mechanism will be operated by the needle-carrier, substantially in the manner set forth.

25. The needle-carrier as constructed with a cam-shaped slot, $i^2$, or its equivalents, for operating the looping mechanism, substantially as shown.

26. The combination of the slot $i^2$, tri-armed lever $f^2$, stud $h^2$, looper-rod $c^{20}$, cam-groove $k^2$, cam-groove $p^2$, projection $r^2$, and stud $q^2$, or their equivalents, for producing the compound movements of the looper, substantially as set forth and described.

27. A looping mechanism, considered or taken as a whole, constructed and operating substantially as set forth and specified.

28. The combination and arrangement of the socket $t^{20}$, or its equivalent, with the clutch-shaft or its crank, for connecting the spool or bobbin to the said shaft preparatory to filling it, substantially as described.

29. A narrowing and widening mechanism consisting of the row of holes $w'$, the pins $x' x'$, the slide-rod $q'$, provided with projections $p' p'$ and $z'$, to operate with the pins $x' x'$ and clutch-lever $o'$, or their equivalents, substantially as set forth and described.

30. The application of the shipping-pins $x' x'$ directly to the index-plates $y' y'$, substantially in the manner and for the purposes specified.

31. The means of holding or keeping the loop on the tooth until the needle has fairly entered the loop, such being effected by the looper itself, substantially in the manner set forth and described.

32. A combination composed of an eye-pointed needle, a tension mechanism, a work-supporting comb, and a looping mechanism, substantially such as described, and a yarn-guide, $g$, arranged and used in the manner and for the purposes specified.

33. The peculiar construction of the eye-pointed needle—that is, the bent or crooked form described—so that the old loop may have room to pass back under the tooth, when said needle is arranged and used substantially in the manner set forth.

34. The arch $k'$, or its equivalent, arranged with respect to the comb as shown, for supporting the plate $i'$ and bracket $t^2$, substantially in the manner set forth.

35. A knitting-machine composed of all the instrumentalities hereinbefore mentioned, or their equivalents, when constructed, combined, and used substantially in the manner and for the purposes specified.

JONAS HINKLEY.

Witnesses:
   FREDERICK H. PATCH,
   REUBEN T. RUST.